March 7, 1961 M. G. DREYFUS ET AL 2,973,686
APPARATUS FOR SPECTROPHOTOMETRIC MONITORING
OF THIN FILM COATINGS
Filed Oct. 11, 1957 2 Sheets-Sheet 1
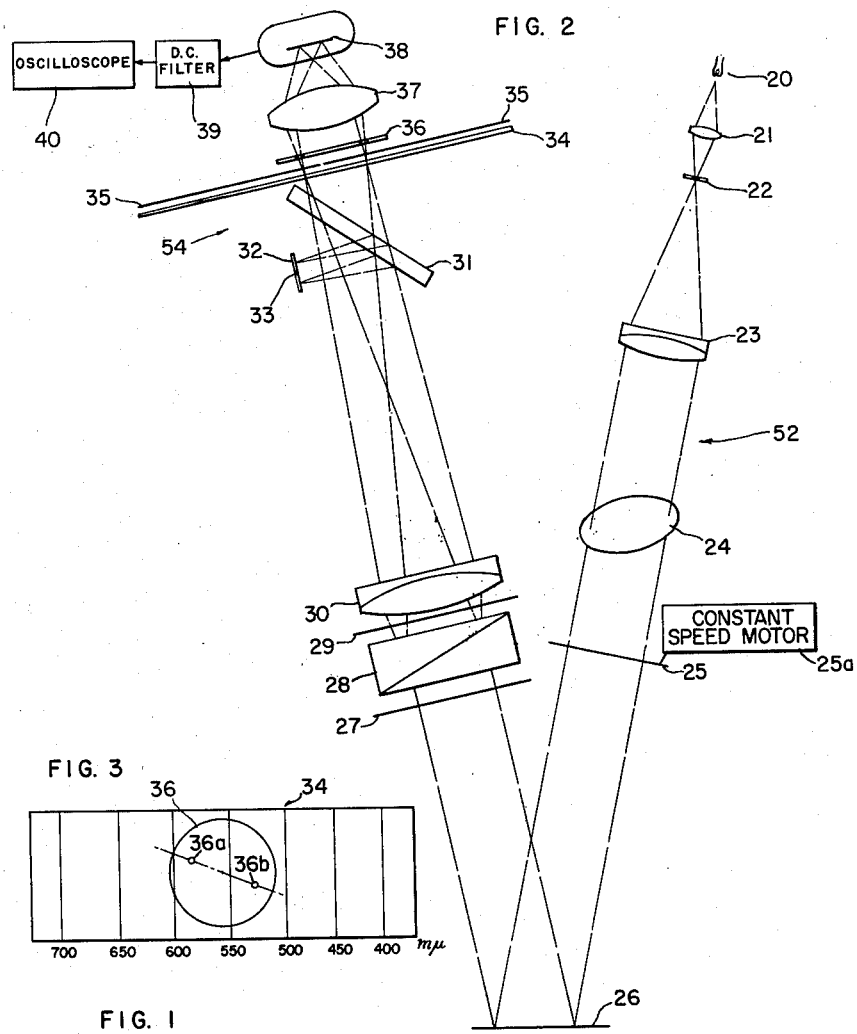
INVENTOR.
MARC G. DREYFUS
CEDRIC M. POLAND
BY
ATTORNEY

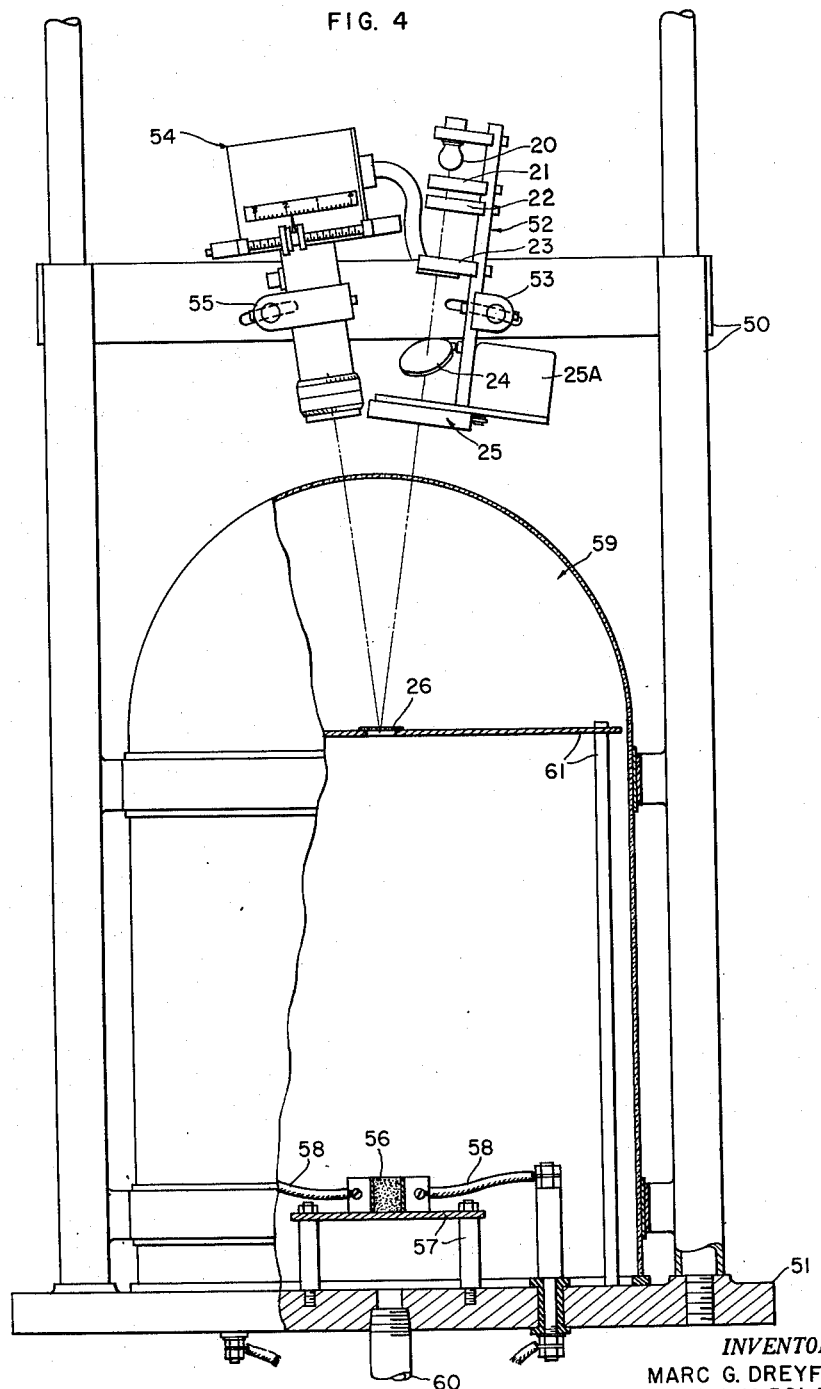

United States Patent Office 2,973,686
Patented Mar. 7, 1961

2,973,686

APPARATUS FOR SPECTROPHOTOMETRIC MONITORING OF THIN FILM COATINGS

Marc G. Dreyfus, Van Nuys, and Cedric M. Poland, Sherman Oaks, Calif., assignors to General Precision, Inc., a corporation of Delaware Filed Oct. 11, 1957, Ser. No. 689,705

3 Claims. (Cl. 88—14)

This invention relates to a new and improved apparatus for measuring and controlling the thickness of thin, partially transparent films, and more particularly to new and improved spectrophotometric monitoring of low-loss interference monolayers.

Monitoring techniques using a two-color process have been disclosed in the prior art. For example, see McRae Patent No. 2,472,605. However, certain disadvantages are inherent in the prior art. For example, it has been extremely difficult to provide narrow monitoring bandwidths. Because of the wide monitoring bands used, the effectiveness of the monitor was limited to use with very thin films only. Further, the monitoring bands were fixed in location; this often led to unequal output signals at the desired end-point. It was thus necessary to read output ratios rather than being able to use signal nulls. Another problem which is encountered in the prior art is the confusion and loss of sensitivity introduced into the monitoring system by stray light, such as that generated by the incandescent boats used for evaporating the coating material.

Briefly described, our invention embodies apparatus for illuminating a sample and measuring apparatus for analyzing the effect of the sample on the incident illumination. The illuminator identifies the supplied light so that it can be distinguished from stray or other undesired light. This is accomplished by a rotating polarizer and a set of pinholes which, in combination, tend to restrict the effective illumination to light from the source and sample only, and to impart a rotating polarization to this illumination.

The measuring device selects two narrow bands of wavelengths from the sample and compares their intensities using a null-seeking technique. The result of this comparison yields a measurement of the thickness of the film coated on the sample. The two bands used by the measuring apparatus are variable in a continuous manner in spectral location and in wavelength separation by apparatus including a wedge interference filter.

An object of this invention is to provide new and improved apparatus for controlling the thickness of a vacuum-deposited, thin, partially transparent film.

Another object of this invention is to provide new and improved apparatus for the control of layer thickness in the construction of multi-layer interference filters.

Still another object of this invention is to provide a new and improved apparatus for controlling the accuracy of thickness of deposited films over a wide range of thickness values.

A further object of this invention is to provide a new and improved apparatus to facilitate identification of the end point of an optical coating process.

A still further object of this invention is to provide a new and improved apparatus for the identificatoin of the light useful for monitoring such that said light can be distinguished from stray, undesired light.

Another object of this invention is the provision of a new and improved apparatus which uses narrow bandwidths for monitoring purposes which bandwidths can be chosen wherever desired in the light frequency spectrum.

Still another object of this invention is to overcome certain disadvantages inherent in the prior art.

Other objects and advantages of this invention will appear during the following detailed description of a preferred form of the invention, reference being had to the accompanying drawings forming a part of this specification, in which:

Figure 1 is a graph showing the relationship of relative light intensities reflected or transmitted by a coated sample to the optical path difference in wavelengths generated by the coating thickness;

Figure 2 shows a functional schematic diagram of a preferred form of the monitoring system embodying this invention;

Figure 3 shows a view of the action of the rotatable mask used in conjunction with the interference wedge; and Figure 4 shows an over-all view of the monitoring apparatus installed in position.

Many optical methods for monitoring the thickness of a thin film, and by monitoring within the purview of this application is meant measuring the thickness of the film, depend upon observation of color changes in the transmitted or reflected light from the thin film. These color changes are due to changes in spectral characteristics which are shown in Figure 1. This figure is a plot of relative reflected or transmitted light intensity (ratio of the reflected or transmitted intensity to the incident intensity), versus optical path difference in wavelengths on a logarithmic scale. Optical path difference is roughly proportional to thickness of the deposited film. Figure 1, as shown, depicts the reflectance of low index coatings or the transmittance of high index coatings. Since path difference is approximately inversely proportional to wavelength, it follows that identification of a particular path difference with a particular spectral wavelength provides a picture of intensity ratio versus a range of wavelengths. This can be accomplished using Figure 1 by tracing the wavelength scale and superimposing a chosen wavelength on a known path difference. Thus, the relative intensity of reflected or transmitted light can be read for any wavelength on this scale. Figure 1 also furnishes a graphic picture of the spectral changes which occur as the coating thickness increases since each wavelength can be identified with increasing path difference by sliding the wavelength scale to the right on the graph. Selecting, as an example, a wavelength in the green (5500 A.), Figure 1 shows that when the wavelength scale is placed such that its green sector is coincident with the first minimum of the curve (point 11), the represented reflectance is relatively rich in blue and red and a distinctive purple color is generated. At this point, the thickness of the coating material is effectively one-quarter wave for green light. Other visual purples occur at points 13, 15, 17, etc., odd multiplies of one-quarter wave in optical thickness for the green. Thus, in order to ascertain when the thickness of a coating is precisely an odd multiple of a quarter wavelength for a chosen color, a minimum of the curve of Figure 1 for that color must be accurately detected.

Applicants' invention provides means for detecting or monitoring a chosen minimum for a chosen color (wavelength) by selecting two narrow bands of wavelengths straddling the chosen wavelength (color) and observing the relative intensities of the bands. These two narrow bands can be selected such that their intensities will be equal when the coating is the desired thickness. The wavelength span between the bands can be chosen such that the difference in intensities between the bands will exhibit a maximum spectral rate of change at the desired end point in the coating process consistent with the flexibility desired in the range of end point thicknesses and the spectral bandwidth limitations of various monitor components. These criteria for choice of monitoring bands provide optimum sensitivity for the monitoring system embodying applicants' invention. As the coating becomes thicker, the spectral alternations in reflectance become more rapid (see Figure 1) and thus require narrower monitoring bands. The apparatus disclosed herein generates monitoring bandwidths sufficiently narrow to control accurately the deposition of layers several wavelengths thick.

Referring to Figure 2, a spiral filament acts as a light source 20 and provides polychromatic light. The light source 20 in combination with a condensing lens 21 and pinhole 22 establish a point source. The light emitting from the point source passes through an achromatic doublet lens 23 which collimates the light into a parallel beam. The parallel beam passes through a compensating plate 24 to a rotating polarizer 25 which identifies the beam. Polarizer 25 is rotated at a constant speed by means of motor 25A. This identification is necessary to distinguish the light used for monitoring from any other extraneous light. The rotating polarizer 25 provides a polarization which will later be used to modulate two narrow selected bands of wavelengths in a sinusoidal manner with a 90° phase difference between the bands. The rotating polarization also serves to distinguish the desired light from light originating from the incandescent boat 56 in the vacuum chamber 59 shown in Figure 4. Therefore, it is desirable to identify the monitoring light before it enters the vacuum chamber 59 and is inextricably mixed with stray light. The compensator plate 24 mentioned above serves to remove a certain extraneous signal from the system and preferably consists of a flat clear piece of glass which is mounted so as to be hand rotated. This extraneous signal arises in the following manner. Normally, the monitor system produces two A.C. signals 90° apart in phase. The operation of the system embodied in our invention depends on the exact phase relationship. Arising within the system, however, are polarization effects which produce a small (approximately 1%) quadrature component which prevents the determination of a null to the desired accuracy. This quadrature component must be removed. Removal is accomplished by the compensating partially polarizing compensator plate 24 which can be adjusted to produce a quadrature component equal in magnitude and opposite in phase to the undesired signal, thus effectively cancelling it. Some component which is in phase with one of the two desired A.C. signals is also generally produced by the compensating plate 24, but this can be balanced out elsewhere in the system as will be described in detail subsequently.

From the rotating polarizer 25 the light beam impinges upon the sample 26. This sample 26, which is an article to be coated such as a microscope slide, is contained in the vacuum chamber 59 shown in Figure 4. Imperfections in the glass forming the vacuum chamber 59 or in the sample could cause a loss in efficiency of the system in that a certain scattering of light could take place. However, the optical design of the system is such that these loses are minimized and are unimportant for practical purposes.

There are two reflecting surfaces on the sample. The upper surface reflection is unchanged during the coating process. Therefore, its effect is balanced within the system since the monitoring system is only sensitive to changes. However, the spectral reflectivity of the lower surface of the sample will change during deposition and it is this change which is measured.

Light reflected from the sample 26 passes through an ultra-violet filter 27 which serves as the sealing window of the measuring apparatus. The ultra-violet filter 27 helps to eliminate any ultra-violet light which, although not used for monitoring purposes, might be transmitted to a photomultiplier cathode 38. Since the photomultiplier cathode 38 is very sensitive to ultra-violet light, the presence of such light would produce a large spurious signal unless filtered out.

Light admitted through the filter 27 impinges upon a Wollaston prism 28. A Wollaston prism normally splits an incident beam of unpolarized collimated light into two orthogonally polarized collimated beams proceeding in different directions. However, the beam incident upon the Wollaston prism 28 has a rotating polarization which has been described above, hence, the emergent beam intensities are modulated in a sine squared manner. The net effect is that each emergent beam has a sine square variation in intensity and that these intensity variations are separated in phase by 90°; i.e., the intensity of one beam is proportional to $(sine)^2$ and the intensity of the second beam is proportional to $(cosine)^2$. The two beams are orthogonally polarized and emerge from the Wollaston prism 28 in different directions. The Wollaston prism 28 is rotatable for reasons to be discussed below.

From the Wollaston prism 28 the two beams pass through a rotatable or balancing polarizer 29. The polarizer 29 is rotated or adjusted by hand for the purpose of adjustment of the monitor prior to operation. The rotatable polarizer 29 functions to adjust the balance between the two polarized beams such that when there is no coating on the sample 26, no A.C. electrical output from the photomultiplier tube will be produced. The rotatable polarizer 29 also passes a single plane of polarization such that the two emergent beams are polarized in the same plane.

The monitoring system operates such that after an initial balancing operation using rotatable polarizer 29, another A.C. output null will be observed when the desired optical coating thickness is obtained. It should be understood, however, that an A.C. output null occurs when that specific ratio of light intensities in the two beams is produced which compensates for the biasing effects occurring within the system and hence these intensities will not, in general, be equal at the A.C. null point. It is possible to operate the monitoring system in another mode of operation. This second mode of operation requires that no A.C. electrical output exist from the photomultiplier tube when a film of known thickness is inserted into the monitoring system. Thus, when an equivalent film is deposited on another surface, another A.C. output null will be observed. In addition, the rotatable polarizer 29 is used to compensate for the effects of all spectral biases introduced into the system by its various components. The two orthogonally polarized beams emerging from the rotatable polarizer 29 are physically separated further by a doublet lens 30 which forms a separate point image from each collimated beam. An aiming reflector 31 is introduced into the monitor system so that the monitor can be oriented with respect to the direction of the incident collimated beam. The aiming reflector 31 uses approximately 10% of the incident light energy contained in one of the two point images and because of its dual reflecting surfaces produces two point images on the aiming screen 32 which, when symmetrically oriented about aim point 33 assure correct alignment of the monitor. The two separated main beams emerging from the aiming reflector 31 pass to an interference wedge 34, illustrated in detail in Figure 3, and which is designed to slide transversely. The interference wedge 34 with its supplementary filters 35 serves to isolate a narrow range of wavelengths from the continuum present in each point image, and to transmit this range or band of wavelengths to the photomultiplier cathode 38.

Since each beam impinges on the interference wedge at a different physical position, and passes through openings 36a and 36b we obtain two distinct narrow bands of wavelengths, depending for their width upon the transverse or lateral adjustment of wedge 34, one band from each image beam. Thus, the wedge 34 serves as a variable or adjustable filter, variation in wavelength being controlled by the physical position of the impinging light point along the length of the wedge. The band-pass of a point on the surface of the wedge is approximately 100 A. in halfwidth. The interference wedge 34 also transmits certain undesired wavelength which are removed by supplementary filters 35. The two beams each containing a narrow band of wavelengths emerge from the supplementary filters 35 and pass through a mask 36 which if desired can be made rotatable by hand for fine adjustment. However, it has been found in practice that it is not normally necessary to make this adjustment. The rotatable mask 36 serves to pass the desired light having the wave lengths within the band desired while substantially blocking any extraneous light from whatever source including light having undesired wave lengths originating from light 20. Any such light which reaches the photomultiplier tube cathode 38 produces a D.C. signal which tends to saturate the photomultiplier tube and prevent proper operation. The chief sources of extraneous light are the incandescent boat 56 in Figure 4 and room ambient light.

Figure 3 shows a plan view of the rotatable mask 36 as seen through the interference wedge 34. The Wollaston prism 28 rotates in conjunction with the rotatable mask 36. By combining rotation of the Wollaston prism 28 and the rotatable mask 36 with transverse motion of the interference wedge 34, it is possible to vary the spectral location of the two chosen wavelength bands independently. Rotation of the Wollaston prism 28 and the rotatable mask 36 changes the wavelength separation of the chosen wavelength bands by varying the physical separation of the impinging light images along the length (chromatic axis) of the interference wedge 34 as shown in Figure 3. The transverse position of the interference wedge 34 controls the mean spectral location of the chosen pair of images. From the rotatable mask, the two beams pass through a condenser lens 37 in Figure 2 which combines the two beams by imaging the entrance pupil of the monitor onto one common portion of the photomultiplier cathode 38. The common imaging adds an intensity component which is proportional to $(sine)^2$ to an intensity component which is proportional to $(cosine)^2$. The net effect of the addition is to generate a constant level of illumination when the constants of proportionality (i.e., intensity amplitudes) are equal, since $K \sin^2 + K \cos^2 = K$. When the intensity amplitudes are not equal there is a residual A.C. component. This common imaging also avoids problems introduced by differential fatiguing of the photomultiplier cathode 38. The output from the photomultiplier tube is passed through a D.C. filter 39 which removes the D.C. component from the photomultiplier tube. The A.C. signal is observed on an oscilloscope 40.

Figure 4 shows an over-all view of the monitoring apparatus installed in position. In Figure 4 the support structure 50 for the monitoring apparatus is fitted into a base plate 51. The illuminator section 52 is connected to the support structure 50 by the slotted pivot 53. The monitor section 54 is connected to the support structure 50 by the slotted pivot 55. The incandescent boat 56 which contains the desired material for vacuum deposition is supported on a structure 57 and connected to an external electrical supply by the electrical connections 58. A bell jar 59, which forms the vacuum chamber, fits on the base plate 51. A pump outlet 60 is provided for evacuation of the chamber. The sample to be coated, 26, is also placed in the vacuum chamber on a support structure 61.

We claim:

1. Apparatus for spectrophotometric monitoring of thin film coatings on a sample comprising a rotating polarizer for directing a light beam having a synchronously varying polarization on said sample, a Wollaston prism interposed in the path of said beam for separating said beam into two separate beams polarized orthogonally to each other, an interference wedge interposed in the path of said two separated beams adapted to transmit a different selected narrow band of wavelengths from each of said two beams, photo-electric means positioned to receive said two separated beams and to convert the light energy contained in said two separated beams into two separate electrical signals, and means for observing the comparative intensities of said electrical signals.

2. Apparatus for spectrophotometric monitoring of thin film coatings on a sample, comprising an illuminator directing a beam of parallel light rays on said sample, a compensator interposed in the path of said beam adapted to remove undesired polarization effects from said beam, a rotatable polarizer interposed in the path of said beam imparting a synchoronously varying polarization to said beam, means to drive said rotatable polarizer at a constant speed, a Wollaston prism interposed in the path of said beam for separating said beam into two separate beams polarized orthogonally to each other, an interference wedge interposed in the path of said two separated beams adapted to transmit a different selected narrow band of wavelengths from each of said two beams, photo-electric means positioned to receive said two separated beams and to convert the light energy contained in said two separated beams into two separate electrical signals, and means for observing the comparative intensities of said electrical signals.

3. Apparatus for spectrophotometric monitoring of thin film coatings on a sample, comprising an illuminator directing a beam of parallel light rays on said sample, a rotatable polarizer interposed in the path of said beam imparting a synchronously varying polarization to said beam, means to drive said rotatable polarizer at a constant speed, a Wollaston prism interposed in the path of said beam for separating said beam into two separate beams polarized orthogonally to each other, a balancing polarizer interposed in the paths of said two beams controlling the ratio between the intensities of said two beams, an interference wedge interposed in the path of said two beams adapted to transmit a different selected narrow band of wavelengths from each of said two beams, photo-electric means positioned to receive said two beams and to convert the light energy contained in said two beams into two separate electrical signals, and means for observing the comparative intensities of said electrical singals.

References Cited in the file of this patent

UNITED STATES PATENTS

| | | |
|---|---|---|
| 2,189,270 | Pineo | Feb. 6, 1940 |
| 2,338,234 | Dimmick | Jan. 4, 1944 |
| 2,460,515 | Lowber et al. | Feb. 1, 1949 |
| 2,472,605 | McRae et al. | June 7, 1949 |
| 2,584,583 | Hillery | Feb. 5, 1952 |
| 2,587,282 | Blodgett | Feb. 26, 1952 |
| 2,845,838 | Lindberg et al. | Aug. 5, 1958 |